(12) United States Patent
Gardner (10) Patent No.: US 7,763,231 B2
(45) Date of Patent: Jul. 27, 2010

(54) SYSTEM AND METHOD OF SYNTHESIZING CARBON NANOTUBES

(75) Inventor: Slade H. Gardner, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 154 days.

(21) Appl. No.: 11/834,210

(22) Filed: Aug. 6, 2007

(65) Prior Publication Data

US 2008/0170983 A1 Jul. 17, 2008

Related U.S. Application Data

(62) Division of application No. 10/455,767, filed on Jun. 5, 2003, now Pat. No. 7,261,779.

(51) Int. Cl.
| | |
|---|---|
| D01C 5/00 | (2006.01) |
| D01F 9/12 | (2006.01) |
| D04H 1/64 | (2006.01) |
| H01J 37/30 | (2006.01) |
| H05H 1/26 | (2006.01) |
| B29C 35/08 | (2006.01) |
| H05B 1/00 | (2006.01) |

(52) U.S. Cl. ............... 423/447.3; 423/447.1; 423/447.2; 423/447.7; 264/128; 264/461; 264/483; 264/496; 264/469; 977/742; 977/773; 977/777; 977/750

(58) Field of Classification Search ........................ None
See application file for complete search history.

(56) References Cited

U.S. PATENT DOCUMENTS

| | | | |
|---|---|---|---|
| 4,599,133 A | 7/1986 | Miyao et al. | |
| 4,778,693 A | 10/1988 | Drozdowicz et al. | |
| 4,801,352 A | 1/1989 | Piwczyk | |
| 4,924,807 A | 5/1990 | Nakayama et al. | |
| 5,060,595 A | 10/1991 | Ziv et al. | |
| 5,145,714 A | 9/1992 | Reisman et al. | |

(Continued)

FOREIGN PATENT DOCUMENTS

EP 05314157 2/1995

(Continued)

OTHER PUBLICATIONS

Smiljanic et al.; Gas-Phase Synthesis of SWNT By An Atmospheric Pressure Plasma Jet; Chemical Physics Letters; 359, pp. 189-193; Apr. 2002.*

(Continued)

Primary Examiner—Melvin C Mayes
Assistant Examiner—Guinever S Gregorio
(74) Attorney, Agent, or Firm—Bracewell & Giuliani LLP (57) ABSTRACT

A process for producing carbon nanotubes includes carbon plasma generation with microwave energy, plasma stabilization, and product deposition. Stabilization homogenizes the plasma energy density and concentration, leading to a more efficient reactor. A transition metal catalyst and associated catalyst support are used to form the end product. The formation region may have variations of geometry and supporting equipment that will affect the rate and purity of production. The formation region is immediately downstream from the plasma stabilization region such that the apparatus may be mounted on a robotic arm for direct deposition of product.

20 Claims, 6 Drawing Sheets

U.S. PATENT DOCUMENTS

| | | | |
|---|---|---|---|
| 5,171,610 | A | 12/1992 | Liu |
| 5,405,481 | A | 4/1995 | Licoppe et al. |
| 5,437,820 | A | 8/1995 | Brotz |
| 5,502,001 | A | 3/1996 | Okamoto |
| 5,509,843 | A | 4/1996 | Akama |
| 5,617,911 | A | 4/1997 | Sterett et al. |
| 5,718,951 | A | 2/1998 | Sterett et al. |
| 5,745,153 | A | 4/1998 | Kessler et al. |
| 5,746,844 | A | 5/1998 | Sterett et al. |
| 5,779,863 | A | 7/1998 | Ha et al. |
| 5,787,965 | A | 8/1998 | Sterett et al. |
| 5,837,960 | A | 11/1998 | Lewis et al. |
| 5,960,853 | A | 10/1999 | Sterett et al. |
| 5,963,577 | A | 10/1999 | Snyder et al. |
| 5,998,097 | A | 12/1999 | Hatakeyama et al. |
| 6,033,721 | A | 3/2000 | Nassuphis |
| 6,046,426 | A | 4/2000 | Jeantette et al. |
| 6,090,458 | A | 7/2000 | Murakami |
| 6,268,584 | B1 | 7/2001 | Keicher et al. |
| 6,749,827 | B2 | 6/2004 | Smalley et al. |
| 6,936,233 | B2 | 8/2005 | Smalley et al. |
| 6,949,237 | B2 | 9/2005 | Smalley et al. |
| 6,979,709 | B2 | 12/2005 | Smalley et al. |
| 6,986,876 | B2 | 1/2006 | Smalley et al. |
| 7,008,604 | B2 | 3/2006 | Smalley et al. |
| 7,041,620 | B2 | 5/2006 | Smalley et al. |
| 7,071,406 | B2 | 7/2006 | Smalley et al. |
| 7,105,596 | B2 | 9/2006 | Smalley et al. |
| 7,205,069 | B2 | 4/2007 | Smalley et al. |
| 2002/0102196 | A1 | 8/2002 | Smalley et al. |
| 2003/0026917 | A1* | 2/2003 | Lin et al. .................. 427/453 |
| 2006/0127299 | A1* | 6/2006 | Harbec et al. ........... 423/445 B |

FOREIGN PATENT DOCUMENTS

JP      59180519      10/1984

OTHER PUBLICATIONS

Ajayan et al.; Applications of Carbon Nanotubes; Topics Appl. Phys.; 80, 391-425; 2001.*

Yoshida et al.; Characterization of a Hybrid Plasma and its Application to a Chemical Synthesis; Journal App. Phys.; 54 (2), pp. 640-646); 1983.*

* cited by examiner

SYSTEM AND METHOD OF SYNTHESIZING CARBON NANOTUBES

This patent application is a divisional of U.S. patent application Ser. No. 10/455,767, filed Jun. 5, 2003, now U.S. Pat. No. 7,261,779 B2, issued on Aug. 28, 2007, and entitled System, Method, and Apparatus for Continuous Synthesis of Single-Walled Carbon Nanotubes.

BACKGROUND OF THE INVENTION

1. Technical Field

The present invention relates in general to an improved process for manufacturing carbon nanotubes and, in particular, to an improved system, method, and apparatus for continuous synthesis of single-walled carbon nanotubes.

2. Description of the Related Art

Currently, production of single-walled carbon nanotubes (swcnt) is substantially limited to an experimental or laboratory scale with the largest production rates being on the order of only grams per day. There are several different processes that are used for swcnt production, such as laser ablation methods, arc discharge methods, and chemical vapor deposition (CVD) methods. Some of these prior art processes have also combined plasma generation, thermal annealing, and the use of various transition metal catalyst supports with one of the three techniques. See, e.g., U.S. Pat. No. 6,451,175 to Lal; U.S. Pat. No. 6,422,450 to Zhou; U.S. Pat. No. 6,232,706 to Dai; and U.S. Pat. No. 6,221,330 to Moy.

There are a number of problems with these existing, prior art methods. Many of them are batch-type processes that are capable of producing product only once per cycle, rather than producing a continuous supply of end product which would be far more desirable. As a result, the rates of production are relatively low, with some methods generating only enough product to scarcely conduct laboratory testing on the end product. Consequently, it would be very difficult if not impossible to scale these methods up to industrial quantity production levels.

The scalability of production methods is critical for many potential industrial applications for swcnt. A few examples include high performance structures manufacturers, such as those in military, aerospace, motorsports, marine, etc., fabrication businesses and, more generally, materials suppliers. The inability to make large quantities of swcnt affordable inherently limits their applications to uses as reinforcements for composites and the like.

Unfortunately, swcnt reinforced composites have a number of limitations themselves, including: fiber/matrix adhesion problems, strength limitations due to matrix design, and only providing incremental improvements in other areas of performance. Furthermore, some prior art methods of producing swcnt make a resultant product that is the relatively low in purity. Thus, an improved process for continuous production of a relatively pure form of swcnt would be highly desirable for many practical applications.

SUMMARY OF THE INVENTION

The present invention comprises a system, method, and apparatus for producing carbon allotropes. One embodiment of the invention uses a three-step process of carbon plasma generation, plasma stabilization, and product spray deposition, all of which are scalable to large, industrial volume production levels. The plasma may be generated in several continuous manners, including microwave energy. The plasma may be stabilized with radio frequency energy. A transition metal catalyst and associated required catalyst support are used to form the end product.

One advantage and application of the present invention is the continuous, large scale production of carbon nanotubes for manufacturing high performance structures. This method is superior to prior art processes because it provides generation of carbon plasma, stabilization of the plasma for homogenization of the reactant mixture and transport of a high concentration of the plasma to the product formation zone, and a reactor design that permits direct manufacturing. The entire apparatus is mounted such that deposition of product can be precisely applied to a structure using an overhead robotic arm.

The initiation of the carbon plasma may be accomplished by several methods. One option is vaporization of a resistively-heated graphite element to create a thermal plasma. Carbon or graphite feedstock, which are readily available from commercial suppliers as rod stock, fiber, or in a special-designed geometry, is continuously fed over two oppositely-charged electrodes. Low voltage, high current, electric power is then passed through the feedstock. This results in rapid resistance-heating of the feedstock. The electric power is regulated by feedback control from an ultra-high temperature pyrometer, which measures the element temperature in order to maintain a peak temperature of around 3000° C. The reactor is closed and sealed with a reduced pressure inert atmosphere of continuously-flowing inert gas. By controlling the feed rate of the feedstock, the pressure of the inert gas, and the electric power level, partial vaporization of the feedstock is controlled to a level such that the there is enough carbon remaining to allow a continuous line feed.

Another method for generating the carbon plasma is to vaporize the feedstock with an electron beam. This method uses an e-beam focused on, for example, a graphite feedstock to generate a carbon plasma. This design allows localized directional control of the energy and efficient energy transfer because of the highly conductive nature of the graphite.

Another method for generating the carbon plasma is catalytic pyrolysis of organic precursors. This is accomplished using a continuous feed of hydrocarbons in an inert gas stream through a heated zone or by passing through a plasma jet. The heated zone can be accomplished using a device like a tube furnace or a tungsten coil. The plasma jet can be accomplished using a cathode/anode plasma gun using a high voltage discharge to dissociate and ionize the hydrocarbon feedstock.

The second step in the process of the present invention is plasma stabilization. Classical chemical engineering reactor design specifies that reactants should form a homogeneous mixture for optimization of product yield, purity, and reaction rate. The stabilization step has been completely ignored in the processes reported in the open literature to date. This stabilization step homogenizes the plasma energy density and concentration, leading to a more efficient reactor. The stabilization of the carbon plasma is achieved using inductively coupled radio frequency (rf) energy or microwave (mw) energy from a wave guide. The power and frequency are controlled such that the carbon plasma remains stable in the vapor phase. Electrical resistance heaters also can be added inside the reactor to maintain a chamber temperature of up to 1700° C. This additional thermal energy may be used to reduce the required rf or mw energy needed to stabilize the carbon plasma, and to also promote a higher concentration of carbon vapor in the reactor. Stabilization of the plasma occurs immediately downstream from the generated plasma.

The third and last stage of the reactor is the swcnt formation zone. One of the important elements of the formation zone is a transition metal catalyst and associated catalyst support. The formation zone may have variations of geometry and supporting equipment that will affect the rate and purity of the swcnt production. The formation zone is immediately downstream from the plasma stabilization zone. One of the simplest designs for the swcnt formation zone is to transport the stabilized plasma through a catalyst screen in the deposition nozzle. The catalyst screen can be made from a variety of materials, depending upon the operating temperature of the stabilization zone. Some of these materials include ceramic fiber mesh with a transition metallic catalyst coating, a metallic screen made directly from the transition metallic catalyst, a carbon fiber coated with a transition metallic catalyst, and/or a porous silica membrane with a transition metallic catalyst deposited on the "exit" side of the membrane. The flow rate, carbon concentration, pressure, and temperature should be carefully regulated. Differential pressure is used to push the swcnt product out the exit port.

Another method is to introduce the transition metal catalyst into the formation zone as a gas phase organometallic compound or as metal nanoparticles. In this manner, the formation of swcnt occurs in the flowing reactant stream and can be ejected for deposition on a surface. Yet another method is to coat a substrate with a transition metal catalyst and allow the formation zone to occur just on the outside of the reactor on the substrate.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Referring to FIGS. 1-8, a system, method, and apparatus for producing single-walled carbon nanotubes (swcnt) in a continuous manner is shown. As will be described in greater detail below, some of the embodiments of the present invention use a three-step process of carbon plasma generation, plasma stabilization, and product deposition, all of which are scalable to large, industrial volume production levels.

Figure 1A:
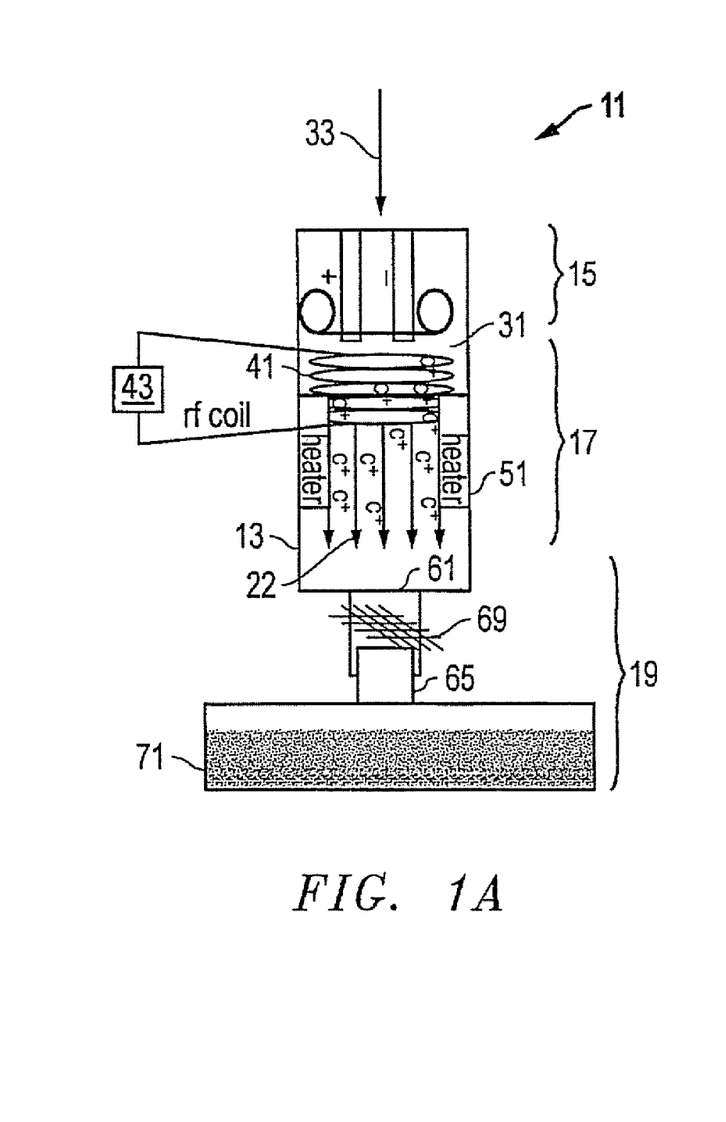
FIGS. 1a and 1b are sectional diagrams of one embodiment of a system, method, and apparatus for continuous synthesis of single-walled carbon nanotubes, and is constructed in accordance with the present invention.
Figure 1B:
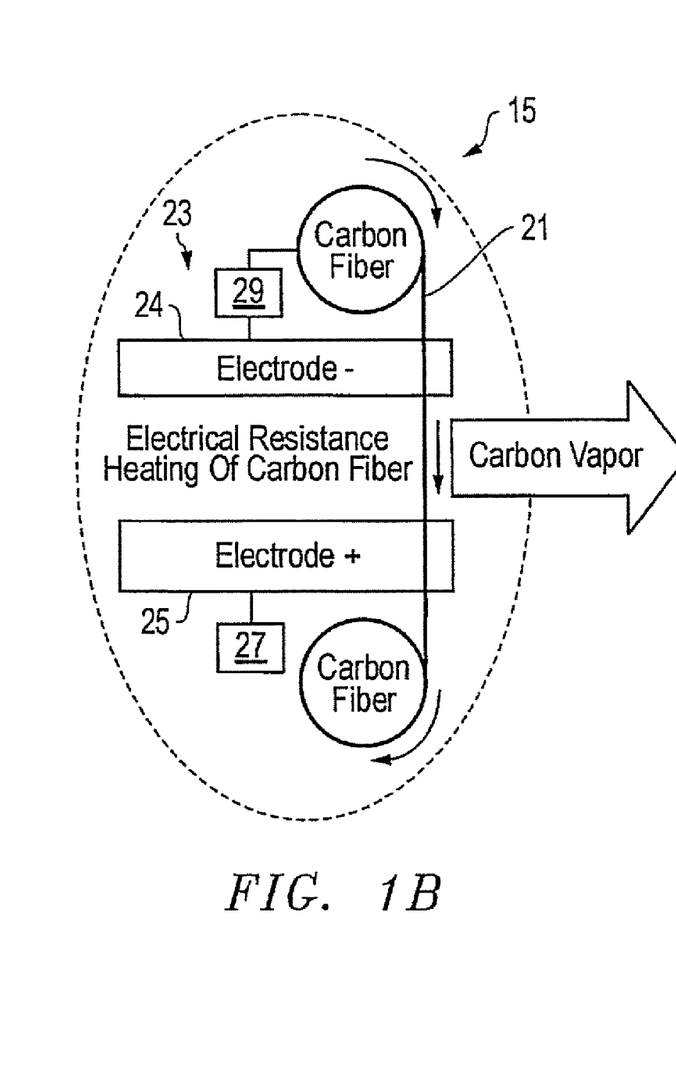

For example, FIGS. 1a and 1b depict one embodiment of an apparatus 11 for producing single-walled carbon nanotubes. Apparatus 11 comprises a continuous operation, flow-through reactor 13 having an initial region 15 (FIG. 1b), a plasma stabilization region 17, and a product formation region 19. The product formation region 19 is located immediately downstream from the plasma stabilization region 17. A feedstock 21 is located in the initial region 15 and is designed and adapted to be continuously supplied to the reactor 13. The feedstock 21 may comprise many different types and forms of material, but is preferably a carbon or graphite fiber feedstock, graphite electrodes, and may be supplied in the form of rod stock or fiber, for example.

Each of the embodiments of the present invention includes means for generating a continuous stream of carbon plasma 22 from the feedstock 21. In this particular embodiment, apparatus 11 utilizes an electrical resistance heater 23 to form the plasma 22. The electrical resistance heater 23 is mounted to the reactor 13 for passing low voltage, high current, electric power through the feedstock 21 over two oppositely-charged electrodes 24, 25, such that the feedstock 21 is rapidly resistance-heated. The electric power is regulated by feedback control 27 from an ultra-high temperature pyrometer 29 for measuring a temperature of the feedstock 21 to maintain a peak temperature of approximately 3000° C.

In one alternate embodiment of the present invention (FIG. 2), the apparatus 111 has means for generating the plasma 122 that comprises an electron beam device 123 that vaporizes the feedstock 121. An electron beam is focused on a graphite target with sufficient energy and spot size to rapidly heat the graphite target, creating a thermal carbon plasma. Beam dithering and graphite feed rate is optimized to provide complete consumption of the feedstock. Like apparatus 11, apparatus 111 comprises a continuous operation, flow-through reactor 113 having an initial plasma generation region 113, a plasma stabilization region 115, and a product formation region 117. A feedstock 121 is continuously supplied to the plasma generation zone 113 for generating a continuous stream of carbon plasma 122 from the feedstock 121. The apparatus 111 further comprises a reduced pressure inert atmosphere of continuously-flowing gas through supply 133. Apparatus 111 also includes inductance coils 141 for stabilizing the carbon plasma in a vapor phase with radio frequency energy.

Figure 2:
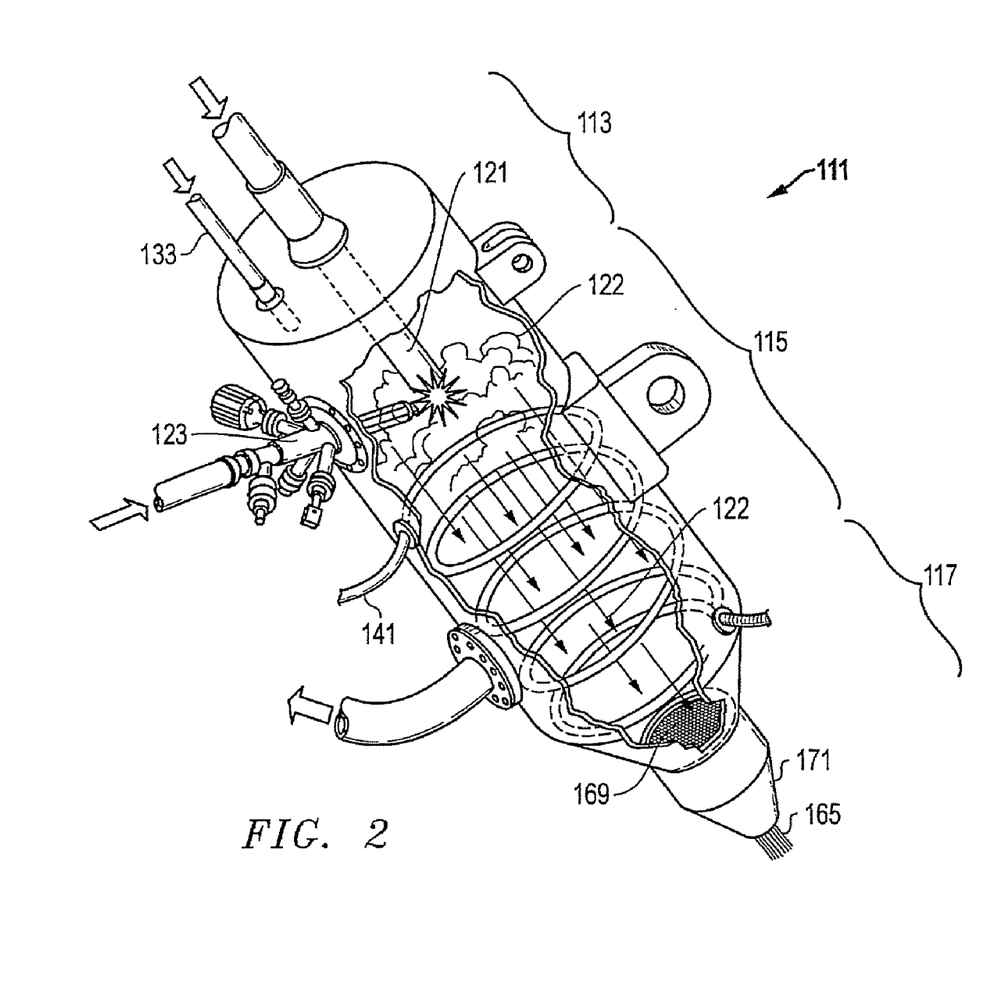
FIG. 2 is an isometric diagram of another embodiment of a system, method, and apparatus for continuous synthesis of single-walled carbon nanotubes, and is constructed in accordance with the present invention.

In addition, the apparatus 111 further comprises optional electrical resistance heaters for applying thermal energy to reduce the radio frequency energy required to stabilize the carbon plasma, and to promote a higher concentration of carbon vapor in the reactor. As will be described in further detail below, apparatus 111 includes a transition metal catalyst and an associated catalyst support 169 for forming a product 165. The transition metal catalyst and the associated catalyst support comprise a catalyst screen 169 in a deposition nozzle 171.

Referring again to FIGS. 1a and 1b, the reactor 13 farther comprises a reduced pressure inert atmosphere 31 of continuously-flowing gas through supply 33. The gas may comprise argon, helium, nitrogen, or other inert gases. Control of a feed rate of the feedstock 21, the pressure of the argon gas 31, and the electric power level results in control of partial vaporization of the feedstock 21 to a level such that enough carbon remains to facilitate a continuous line feed, as shown. As physical contact is required between the two electrodes 24, 25 and some of the carbon feedstock is vaporized, it is important to not vaporize all of the feedstock, thereby leaving sufficient material to provide continuous contact of the feedstock with the trailing and forward electrodes.

Apparatus 11 also includes inductance coils 41 mounted to the reactor 13 for stabilizing the carbon plasma 22 in a vapor phase in the plasma stabilization region 17 with radio frequency energy via controller 43. The carbon plasma is stabilized by controlling the power and a frequency of the radio frequency energy, such that the carbon plasma is stabilized for homogenization of a reactant mixture and transport of a high concentration of the carbon plasma to the product formation region 19. In addition, the apparatus 11 further comprises electrical resistance heaters 51 mounted to the reactor 13 for applying thermal energy inside the reactor 13 to maintain a reactor temperature of up to approximately 1700° C. In this way, the thermal energy reduces the radio frequency energy required to stabilize the carbon plasma 22, and promotes a higher concentration of carbon vapor in the reactor 13.

In the product formation region 19, a transition metal catalyst 61 (see catalyst feed 61a in FIG. 6) on an associated catalyst support 69 for forming a product 65 are used to spray deposit material. As swcnt are grown on the catalyst particles they are entrained downstream towards the exit port of the reactor. Individual swcnt filaments physically bond to each other through van der Waals attraction and form bundles of filaments. As the bundles increase in size, their mass increases and they are pulled from the catalyst support 69 from the force of the entrainment of the flow stream. The flow stream is directed towards a build surface 71 where the swcnt bundles are deposited. The flow rate, carbon concentration, pressure, flow rate, and temperature are carefully regulated. Differential pressure is used to push the product 65 out the exit port. The transition metal catalyst and the associated catalyst support comprise a catalyst screen 69 (see catalyst and support screen 69b in FIG. 7) in a deposition nozzle. The catalyst screen 69 is formed from a material that is selected based upon an operating temperature of the plasma stabilization region 17. The material used to form the catalyst screen 69 is selected from among, for example, ceramic fiber mesh with a transition metallic catalyst coating, a metallic screen made directly from the transition metal catalyst (see catalyst and support screen 69b in FIG. 7), a carbon fiber coated with the transition metallic catalyst, or a porous silica membrane with the transition metallic catalyst deposited on an exit side of the membrane.

Figure 3:
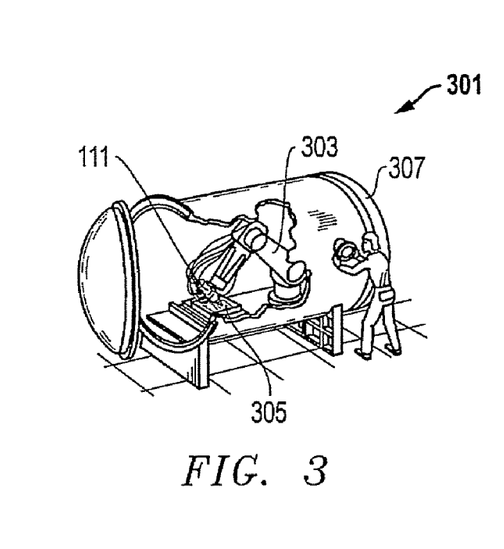
FIG. 3 is schematic isometric view of the system, method, and apparatus of FIG. 2 mounted to a robotic arm for one application, and is constructed in accordance with the present invention.
Figure 4:
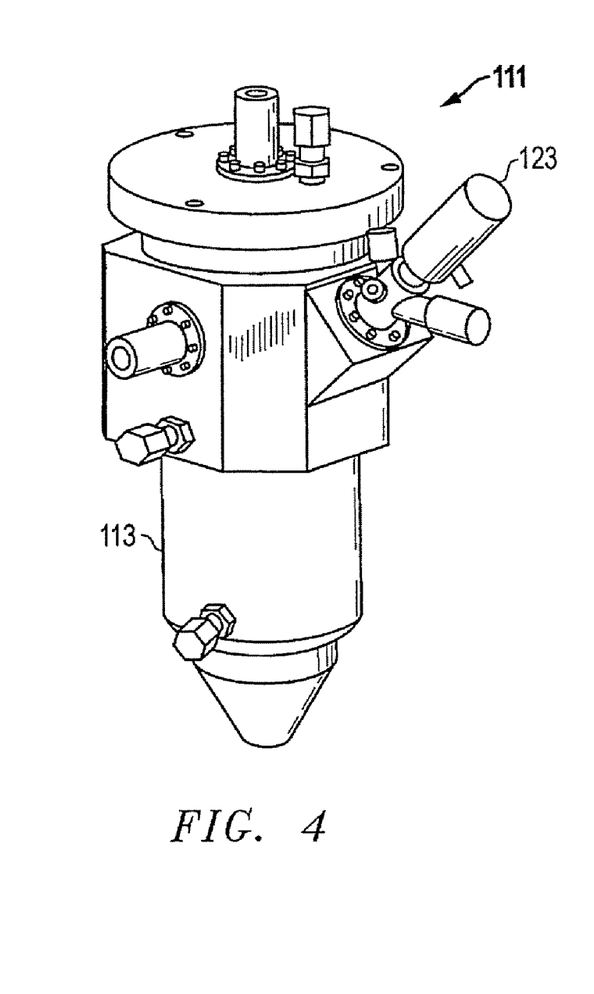
FIG. 4 is an isometric view of the system, method, and apparatus of FIG. 2, and is constructed in accordance with the present invention.
Figure 5:
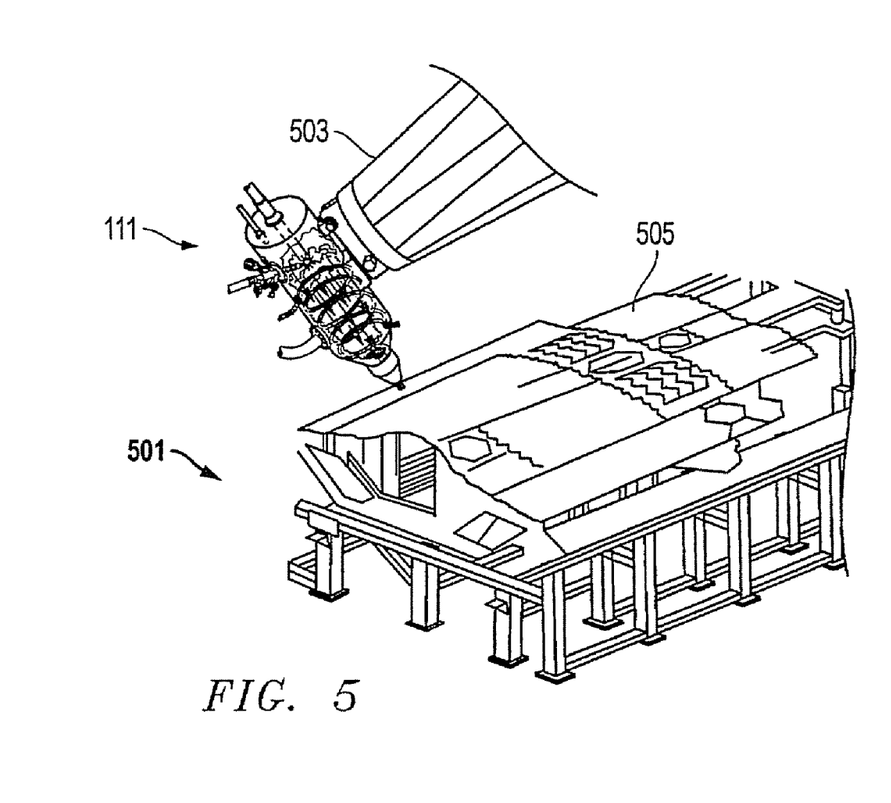
FIG. 5 is schematic isometric view of the system, method, and apparatus of FIG. 2 mounted to a robotic arm for use in a manufacturing operation, and is constructed in accordance with the present invention.
Figure 6:
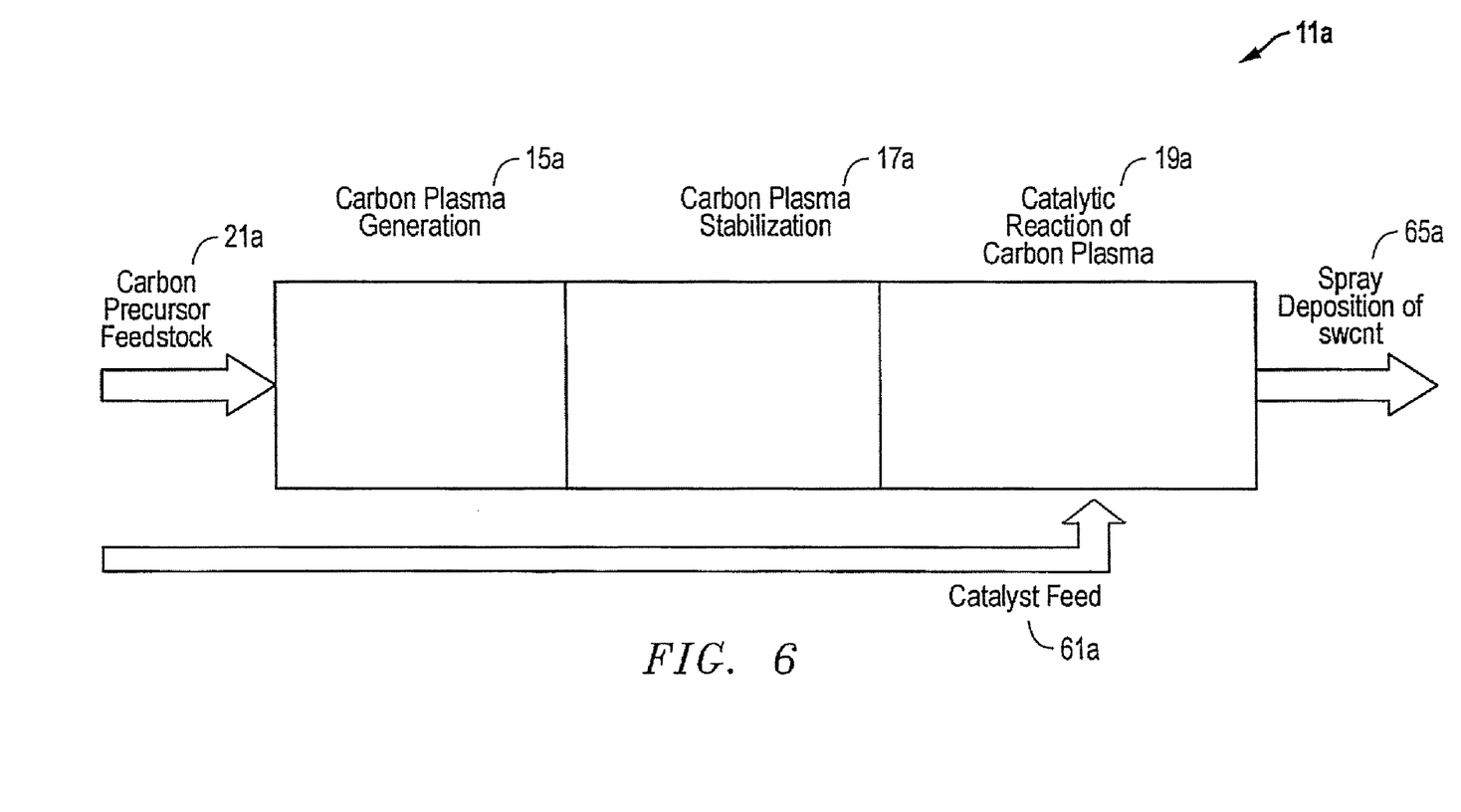
FIG. 6 is a schematic diagram of an alternate embodiment of a system and process for continuous synthesis of single-walled carbon nanotubes constructed in accordance with the present invention.
Figure 7:
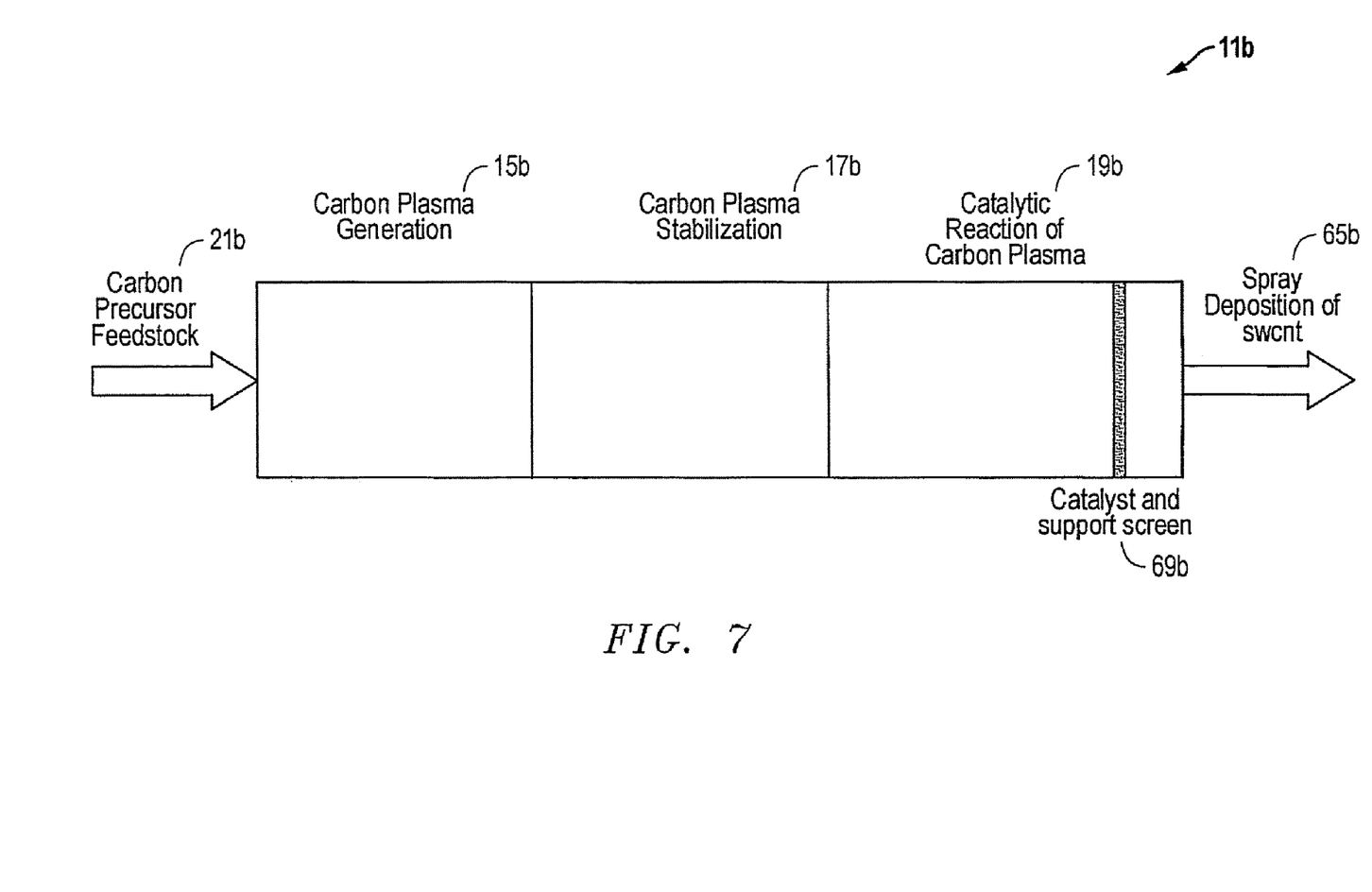
FIG. 7 is a schematic diagram of another alternate embodiment of a system and process for continuous synthesis of single-walled carbon nanotubes constructed in accordance with the present invention.
Figure 8:
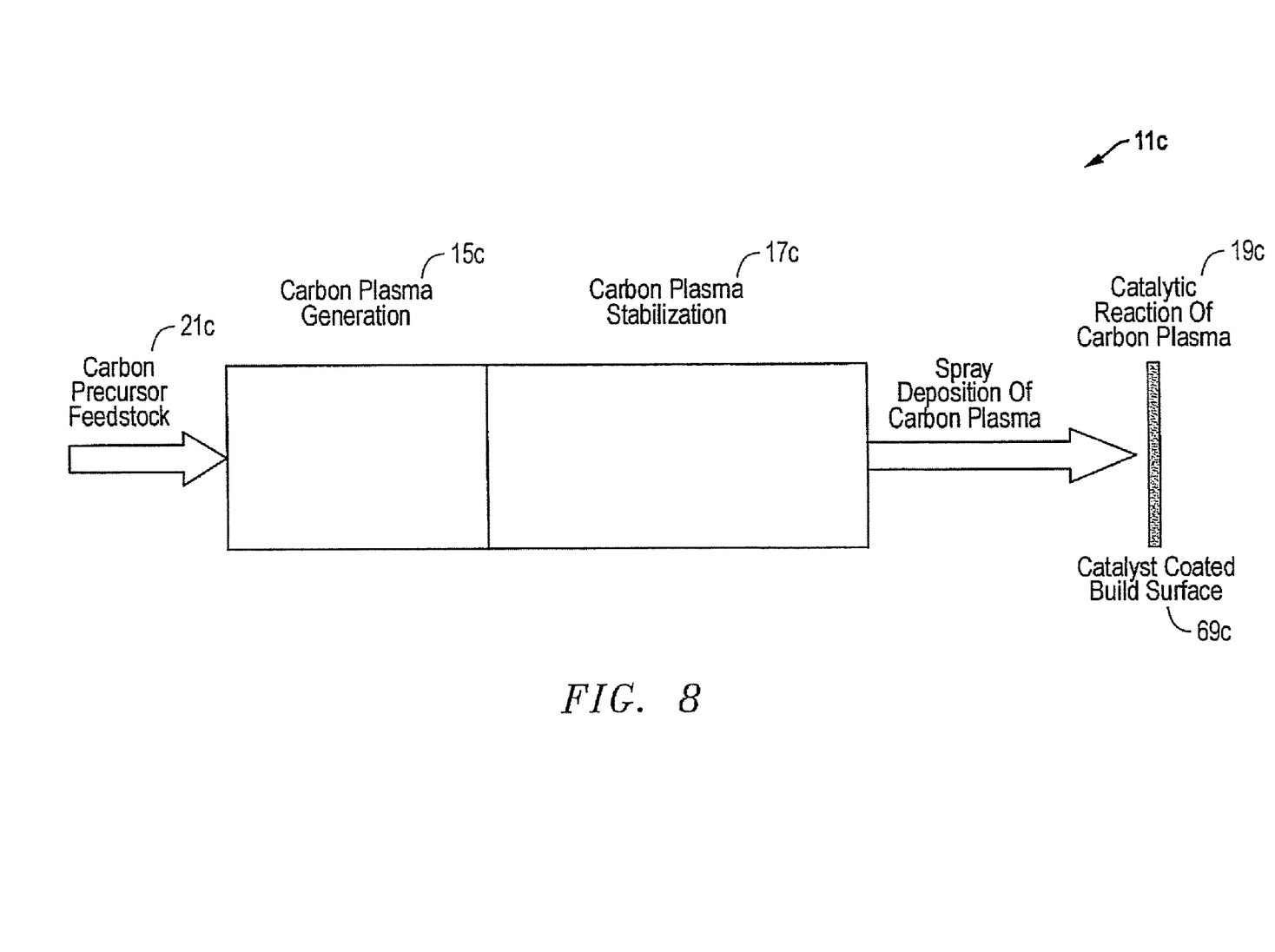
FIG. 8 is a schematic diagram of still another alternate embodiment of a system and process for continuous synthesis of single-walled carbon nanotubes constructed in accordance with the present invention.

As shown in FIGS. 3 and 5, the present invention, such as apparatus 111, may be used as part of a system 301, which comprises a robotic arm 303 for supporting and manipulating the apparatus 111 such that continuous deposition of the product is applied to a workpiece 305 during manufacturing and assembly thereof. In FIG. 3, the apparatus 111, robotic arm 303, and workpiece 305 are located inside a pressure and atmosphere controlled chamber 307. In FIG. 5, apparatus 111 forms part of a system 501 and is mounted to robotic arm 503 for applying product directly to workpiece 505 during manufacturing and assembly thereof.

The present invention has several advantages including the ability to produce single-walled carbon nanotubes in a continuous manner. The three-step process of the invention is scalable to large, industrial volume production levels. In the first step of plasma generation, the plasma may be generated in several ways, including electrical resistance heating and/or electron beam vaporization of feedstock. In the second step of stabilization, the plasma is stabilized with radio frequency energy from inductance coils. In the final step, a transition metal catalyst and associated catalyst support are used to form the swcnt end product.

The present invention continuously produces large quantities of single wall carbon nanotubes. This method is superior to prior art processes because it provides for the continuous generation of carbon plasma, stabilization of the carbon plasma for homogenization of the reactant mixture and transport of a high concentration of carbon plasma to the product formation zone, and a continuous operation, flow-through reactor design. Controlling the feed rate of the feedstock, the pressure of the argon gas, and the electric power level, partial vaporization of the feedstock is controlled to a level such that the there is enough carbon remaining to allow a continuous line feed. Moreover, if the feedstock is vaporized with an electron beam, localized directional control of the energy and efficient energy transfer are achieved because of the highly conductive nature of the graphite. The second step of stabilization is much improved over the prior art. The stabilization step homogenizes the plasma energy density and concentration, leading to a more efficient reactor. The stabilization of the carbon plasma is achieved using radio frequency energy from inductance coils and, optionally, electrical resistance heaters inside the reactor to promote a higher concentration of carbon vapor in the reactor.

The entire apparatus is designed so that it can be mounted vertically such that continuous deposition of product can be applied with precision using an overhead robotic arm. In particular, employing the apparatus of the present invention for manufacturing applications provides outstanding advantages over prior art devices and assembly techniques. For example, the apparatus can be used to provide direct manufacturing of unitized structures using "mix and pour" processing, such that no tooling, fixtures, or part assembly are required. The elimination of these traditional assembly steps yields revolutionary performance. In one embodiment, an apparatus constructed in accordance with the present invention theoretically yields a 68 to 78% weight reduction for some aircraft unitized wing boxes.

While the invention has been shown or described in only some of its forms, it should be apparent to those skilled in the art that it is not so limited, but is susceptible to various changes without departing from the scope of the invention.

What is claimed is:

1. A method of producing carbon nanotubes, comprising:
   (a) generating a stream of carbon plasma in a plasma generating region of a reactor from a feedstock;
   (b) flowing the stream of carbon plasma from the plasma generating region to and through a stabilizing region and applying electromagnetic energy to the carbon plasma while flowing through the stabilizing region by controlling a power and a frequency of the electromagnetic energy supplied to the stabilizing region in order to stabilize the carbon plasma in a vapor phase;

(c) exposing the carbon plasma to a transition metal catalyst to create carbon nanotubes;

(d) flowing an inert gas through the reactor and out a nozzle of the reactor while performing steps (a)-(c); and (e) entraining the carbon nanotubes in the flow of inert gas and spraying the carbon nanotubes through the nozzle onto a workpiece outside of the reactor.

2. A method according to claim 1, wherein step (b) further comprises in addition to the electromagnetic energy supplied in the stabilizing region, applying thermal energy by an electrical resistance heater inside the reactor in the stabilizing region.

3. A method according to claim 1, wherein step (b) comprises flowing the stream of carbon plasma through an electrical inductor coil.

4. A method according to claim 1, wherein step (a) comprises heating a solid material containing carbon to at least vaporize a portion of the material and continuously feeding the material as it is at least partially vaporized.

5. A method according to claim 1, wherein step (c) comprises transporting the plasma after being stabilized in step (b) through a catalyst screen.

6. A method according to claim 1, wherein steps (a), (b) and (c) occur in the reactor and the method further comprises:
mounting the reactor to a robotic arm, and step (e) comprises controlling the robotic arm to directly apply the carbon nanotubes to the workpiece.

7. A method according to claim 6, wherein the reactor, the robotic arm, and the workpiece are located in a pressure and temperature controlled chamber.

8. A method according to claim 1, wherein step (b) comprises flowing the stream of carbon plasma through windings of an electrical inductor coil that is wound around an interior of the reactor.

9. A method according to claim 1, wherein step (b) comprises applying microwave energy from a wave guide.

10. A method according to claim 1, wherein step (a) uses a vapor phase organic feedstock and the carbon plasma is generated using microwave energy.

11. A method according to claim 10, wherein:
step (c) involves synthesis of carbon nanotubes in place on a substrate support containing the transition metal catalyst; and
step (e) comprises dislodging the carbon nanotubes from the substrate support with the flow of inert gas.

12. A method of producing carbon nanotubes, comprising:
(a) providing a reactor mounted to a robotic arm;
(b) generating a stream of carbon plasma by applying energy to a feedstock in region of the reactor;
(c) flowing the stream of carbon plasma into a stabilizing region of the reactor and applying electromagnetic energy to the stream of carbon plasma to create a stabilized stream of carbon plasma in the reactor by controlling a power and a frequency of the electromagnetic energy;
(d) flowing the stabilized stream of carbon plasma into contact with and past a transition metal catalyst to form carbon nanotubes; and (e) discharging the carbon nanotubes from a nozzle of the reactor, moving the reactor with the robotic arm relative to a workpiece that is external to the reactor and depositing the carbon nanotubes on the workpiece.

13. A method according to claim 12, wherein step (c) further comprises applying thermal energy by an electrical resistance heater inside the stabilizing region of the reactor.

14. A method according to claim 12, wherein the feedstock is a solid material containing carbon, and step (b) comprises continuously feeding the feedstock into the plasma generating region initial portion of the reactor and controlling a feed rate of the feedstock to cause at least partial vaporization of the feedstock.

15. A method according to claim 12, wherein step (d) comprises flowing the stabilized plasma through a catalyst screen in the nozzle.

16. A method according to claim 12, wherein the reactor, the robotic arm and the workpiece are located in a pressure and temperature controlled chamber.

17. A method of producing carbon nanotubes, comprising:
(a) providing a reactor with a nozzle, and flowing a stream of inert as through a plasma generating region, a stabilizing region and a product deposition region of the reactor and out the nozzle;
(b) feeding a feedstock comprising a solid material containing carbon into the plasma generating region of the reactor and applying heat to the feedstock to at least partially vaporize the feedstock, generating a stream of carbon plasma;
(c) flowing the stream of carbon plasma from the plasma generating region through an inductive coil in the stabilizing region and applying energy from the inductive coil to the carbon plasma at a power and a frequency to stabilize the carbon plasma in a vapor phase,
(d) flowing the stabilized carbon plasma through a catalyst support in the product deposition region and forming carbon nanotubes on the catalyst support; and
(e) with the flow of inert gas, dislodging the carbon nanotubes from the catalyst support and spraying the carbon nanotubes out the nozzle onto a workpiece external to the reactor.

18. A method according to claim 17, wherein step (b) further comprises applying thermal energy with an electrical resistance heater inside the stabilizing region of the reactor to reduce the energy required to stabilize the carbon plasma with the inductive coil.

19. A method according to claim 17, wherein the feedstock comprises a fiber, and step (b) comprises drawing the fiber from a supply reel to a take-up reel, and contacting a portion of the fiber between the reels with electrodes of an electrical resistance heater.

20. A method according to claim 17, wherein step (b) comprises advancing the feedstock into the plasma generating region of the reactor from a source external of the reactor, applying heat with an electron beam to cause complete vaporization of the feedstock.

* * * * *